United States Patent [19]

McColl

[11] 4,350,190
[45] Sep. 21, 1982

[54] SELF PROPELLED, OFF ROAD VEHICLE

[75] Inventor: Bruce J. McColl, Whitby, Canada

[73] Assignee: Owens-Illinois, Inc., Toledo, Ohio

[21] Appl. No.: 155,901

[22] Filed: Jun. 2, 1980

Related U.S. Application Data

[63] Continuation-in-part of Ser. No. 934,457, Aug. 17, 1978, Pat. No. 4,237,994, and a continuation-in-part of Ser. No. 934,458, Aug. 17, 1978, Pat. No. 4,267,956, and a continuation-in-part of Ser. No. 934,459, Aug. 17, 1978, Pat. No. 4,223,904, and a continuation-in-part of Ser. No. 18,080, Mar. 6, 1979, abandoned.

[51] Int. Cl.$^3$ .............................................. A01G 23/08
[52] U.S. Cl. .................................. 144/3 D; 180/14 R; 180/24; 180/89.13; 280/6 H; 280/96; 280/104; 414/495; 414/528
[58] Field of Search ...................... 180/89.13, 10, 14 S, 180/65 R, 81 R, 327, 107, 108, 109, 42, 105; 414/46, 495, 528; 280/96, 104, 81, 6 H, 6 R; 144/3 D; 83/928; 296/190

[56] References Cited

U.S. PATENT DOCUMENTS

| | | | |
|---|---|---|---|
| 3,490,555 | 1/1970 | Noack | 180/163 |
| 3,631,905 | 1/1972 | Karlin | 144/3 D |
| 3,680,653 | 8/1972 | Murata | 180/89.1 |
| 3,721,077 | 3/1973 | Van der Lely | 180/89.13 |
| 3,799,063 | 3/1974 | Reed | 180/65 R |
| 3,957,165 | 5/1976 | Smith | 180/327 X |
| 4,127,154 | 11/1978 | Kabotoff | 144/3 D |
| 4,144,918 | 3/1979 | Hallstrom | 144/3 D |

*Primary Examiner*—W. D. Bray
*Attorney, Agent, or Firm*—John R. Nelson; Myron E. Click; David H Wilson

[57] ABSTRACT

The invention relates to a unique self propelled vehicle capable of transporting massive loads over natural terrain, such as the loading and transporting whole trees from their growing site to a processing station. The invention provides a vehicle having an elongated rigid frame element supported by two spaced sets of quad wheel assemblies, with each assembly permitting movement of individual wheels about both a roll axis parallel to the longitudinal frame element and a pitch axis transverse to the frame element. An operator's platform is adjustably mounted on the forward portion of the rigid frame structure for vertical movements and may carry with it a boom having means on its free end for severing and engaging whole trees or lifting massive objects to deposit same in cradles or a body mounted on the rigid frame element. Power actuated mechanisms are provided for rotating each wheel, steering each wheel, moving the operator's platform vertically to any desired position, actuating the loading boom, and tilting of the longitudinal frame element to maintain the horizontal plane of the operator's platform, to unlaod a stack of trees carried by the cradles or to lift an end of a quad wheel assembly walking beam. In the event that any wheel becomes inoperative a detachable linkage is provided to anchor the affected wheel in an elevated position as to permit the vehicle to be moved under its own power to a repair station. Power for all such operations is supplied from a power source adjustably mounted for vertical movements on the rear end of the elongated rigid frame element.

26 Claims, 9 Drawing Figures

SELF PROPELLED, OFF ROAD VEHICLE

CROSS REFERENCE TO RELATED APPLICATIONS

This application constitutes a continuation in part of my copending applications, Ser. No. 934,457 filed Aug. 17, 1978 now U.S. Pat. No. 4,237,994, and a continuation in part of Ser. No. 934,458 filed Aug. 17, 1978 now U.S. Pat. No. 4,267,956, and a continuation in part of Ser. No. 934,459 filed Aug. 17, 1978 now, U.S. Pat. No. 4,223,904 and a continuation in part of Ser. No. 018,080 filed Mar. 6, 1979 now abandoned.

BACKGROUND OF THE INVENTION

The inventions described in the afore-mentioned related applications relate to self-propelled vehicles used primarily to transport long loads, such as whole trees or tree trunks across roadless terrain. More specifically, such prior applications relates, as does this application, to rubber tired vehicles that have wheel suspension mechanisms which provide balanced weight between its wheels and additionally permits adjustment of the steady state position of the main bed frame of the vehicle relative to a longitudinal roll axis to permit compensation for the vehicle position when operating continuously on the side of a hill, and also to facilitate unloading of the vehicle by a side dumping action in either direction.

In summary, such vehicle comprises an elongated bed frame that forms the backbone of the vehicle. This frame is balanced on modular front and rear wheel assemblies, preferably each having four quadrilaterally spaced wheels mounting massive pneumatic tires. The quad wheel suspension system is designed to provide a freedom of movement of each wheel about mutually perpendicular roll and pitch axes that are vertically spaced one above the other. The quad wheel assemblies are pivotally mounted on the bed frame so as to be moved about a roll axis which is parallel to and beneath the longitudinal axis of the main frame element. On the lower or pitch axis of each quad wheel assembly, two laterally spaced walking beam members, each carrying a pair of steerable wheels, are rockably mounted in a balanced relationship. Thus, the walking beams may rock about the pitch axis of the quad wheel assembly while the quad wheel assembly itself may pivot about the roll axis. A mechanical interconnection of the quad wheel assemblies comprises a pair of tubular torque transmission members that extend from one quad wheel assembly toward the other and are interconnected by a novel linkage system which continuously adjusts the position of the longitudinal bed frame about the roll axis to lie intermediate the positions of the quad wheel assemblies. Additionally, the linkage incorporates two power extensible links by which the steady state position of the longitudinal bed frame member relative to the roll axis may be selectively determined by the operator.

In accordance with the invention specifically disclosed and claimed in my U.S. Pat. No. 4,205,730 a unique mounting of each wheel with respect to the walking beam member permits a driving motor and brake to be incorporated in the wheel mounting mechanism for imparting required rotational movements to the wheel and, additionally, an electrical or hydraulic actuator is also incorporated in the mounting to impart individually controlled steering movements to the particular wheel. As described and claimed in my aforementioned co-pending application, Ser. No. 934,457, sensors are provided which generate signals respectively proportional to the rotational velocity of the wheel and to the angle of turn of the particular wheel. These sensor signals are inputted to a microprocessor and are compared with the turning position and rotational velocity of the wheel required to effect a particular attitude and movement of the vehicle, and compensating signals are then fed to the driving motor for the wheel and the turning actuator to cause the wheel velocity and wheel position to correspond to that required to effect a desired attitude of the vehicle.

A vehicle equipped with this combination of features has numerous advantages over prior art off-road vehicles. The individual control of the velocity and the turning angle of each wheel permits the vehicle to be manipulated through any selected one of a plurality of unusual movements or attitudes, some of which are incapable of accomplishment by any vehicle equipped with conventional driving and steering mechanisms. Any vehicle as heretofore described requires an operator's cab which is preferably in an elevated position relative to the terrain being transversed, and a power source such as a gasoline or diesel engine driving a hydraulic pump, or, if electric propulsion and steering control is to be employed, an electrical generator of sufficient capacity to provide the required traction and steering power. Hence, the operator's cab and the power unit are relatively massive in size and become a factor in the overall design of the vehicle in order to keep such units from interfering with the load carrying capability of the vehicle and at the same time, to prevent the operator's cab portion or the power unit portion of the vehicle from engaging obstacles on the ground or overhead and interfering with the mobility of the vehicle.

When the vehicle of the type heretofore described is to be employed for harvesting trees, it is quite efficient to provide a tree severing and handling means on the vehicle, which is then driven to the vicinity of the tree to be harvested, the tree engaged by a suitable clamping mechanism carried on the end of a boom, severed by a hydraulically actuated shear, and then the whole tree moved by the clamping mechanism and boom to a position lying within cradles provided on the elongated frame element of the vehicle. Such tree handling elements must, however, be disposed on the vehicle in such fashion as to not interfere with either the load carrying ability or the mobility over the rough terrain where such vehicles are to be employed.

Similarly, if the vehicle to be employed for loading and transporting of massive objects, such as large disabled vehicles or pieces of military equipment, the crane for picking up such items may be mounted on the operator's platform and conveniently controlled by the operator from the platform. For such applications, of course, the vehicle will be provided with an appropriate body or platform on the main frame element capable of receiving or supporting the massive objects to be loaded thereon.

Lastly, it is desirable that the operator's cab be capable of adjustment about a horizontal axis so that the operator is in a substantially upright position, particularly when severing and loading trees, or loading other objects.

A large number of vehicles have heretofore been proposed to be employed in the direct harvesting of trees. If a whole tree, or the whole trunk thereof, is to be bodily removed from a forest, the vehicle to transport such whole trees or trunks necessarily has to have considerable length. Prior art vehicles employed for such purpose have generally resorted to an articulated structure employing a prime mover and one or more trailers pivotally connected to the prime mover. These vehicles could obviously only be loaded with a whole tree when all of the trailed units were in substantial longitudinal alignment, and severe binding, resulting in actual breakage of the tree, would occur whenever the vehicle was steered through any reasonable degree of turn in travelling from the harvesting site to a processing station. The long rigid load represented by a bundle of whole trees superimposed on the structure effectively prevented any relative horizontal pivotal movement of the articulated trailer units and, as a result, the vehicle either became hung-up on obstructions around which the vehicle could not be steered or, portions of the tree load were broken by the forced turning movements of the articulated trailer unit. Backing of the vehicle was also very difficult.

Additionally, such prior art units suffered from the fact that the operator's control cab was generally in a fixed vertical position with respect to the vehicle. If this position were high, then the operator had to be continuously on the alert to steer around trees which were to be left standing or overhanging rock formations. If the operator's cab were left in a lowered position, it would tend to hang-up on obstructions on the ground as the vehicle traversed the uneven rugged terrain that is associated with tree harvesting operations. Similar problems were encounteded with the power unit for such vehicles, which necessarily is relatively massive in size and has to be located on the vehicle so that it does not interfere with the load carrying capacity of the vehicle nor permit the power unit to be impacted by upstanding ridges or rocks on the terrain over which the vehicle is traversed. If the vehicle was cross-wise on a slope, the operator's cab would be tilted, to the discomfort and inconvenience of the operator.

Lastly, since wheel assembly reliability is important, wheel station redundancy is advantageous. For example, massive pneumatic tires are employed on the vehicle and must necessarily be inflated to provide for movement of the vehicle across roadless terrain without damage to such tires. Thus, it becomes very desirable to provide a self jacking mechanism on the vehicle, which may be utilized in the event that any one of the pneumatic tires looses its air pressure, to effect the lifting of the particular wheel carrying the flat tire to an elevated position so that the vehicle may be moved on the remaining wheels to a repair station, hence eliminating any necessity for removing or repairing the massive pneumatic tires in the field.

OBJECTS OF THE INVENTION

Accordingly, it is an object of this invention to provide a vehicle having a single elongated frame element suspended on a pair of quad wheel assemblies of massive rubber tires, with each wheel being individually provided with traction power and steering power and adjustably mounted relative to the frame so as to permit the vehicle to traverse roadless terrain, and providing on the forward end of such vehicle a platform which is selectively adjustable in height relative to the frame, hence, relative to the ground, and which platform carries an operator's cab and, additionally, if desired, either a tree engaging boom, permitting the vehicle to engage a whole tree, sever it and place the tree between load carrying cradles mounted on the elongated frame element, or a crane for loading massive objects onto a platform mounted on the elongated frame element.

A particular object of this invention is to provide an off road vehicle having individual power means for driving and steering each wheel of two quad wheel assemblies which support a single elongated frame element of the vehicle and each wheel is mounted for movement about both a roll axis parallel to the elongated frame and a pitch axis perpendicular to the longitudinal frame element relative to the roll axis of the vehicle so that the operator's platform, carried on one end of the elongated frame, may at any time be positioned in a relatively horizontal plane regardless of the slope of the terrain on which the vehicle wheels may be positioned.

A further object of this invention is to provide a self contained, self propelled off-road vehicle having a plurality of power means on the vehicle for individual driving and steering each of a multiplicity of wheels, plus power means for adjusting the vertical position of an operator's cab, plus power means for operating a tree engaging boom or crane and lastly, power means for adjusting the vertical position of a power producing unit which is shiftably mounted on the rear end of the vehicle.

A particular object of this invention is to provide a self contained elevating and carrying mechanism for each wheel of the off road vehicle, permitting the wheel to be elevated in the event that the wheel becomes inoperative, so that the vehicle can be driven on the remaining wheels to a suitable repair site.

Other objects and advantages of the invention will become apparent to those skilled in the art from the following detailed description, taken in conjunction with the annexed sheets of drawings.

BRIEF DESCRIPTION OF THE DRAWINGS

FIG. 5 is a side elevational view of a modified form of an off road vehicle embodying this invention which may be employed for the transport of relatively massive objects, such as artillery pieces, drilling equipment, bulk supplies, and the like.

DESCRIPTION OF THE PREFERRED EMBODIMENTS

Figure 1:
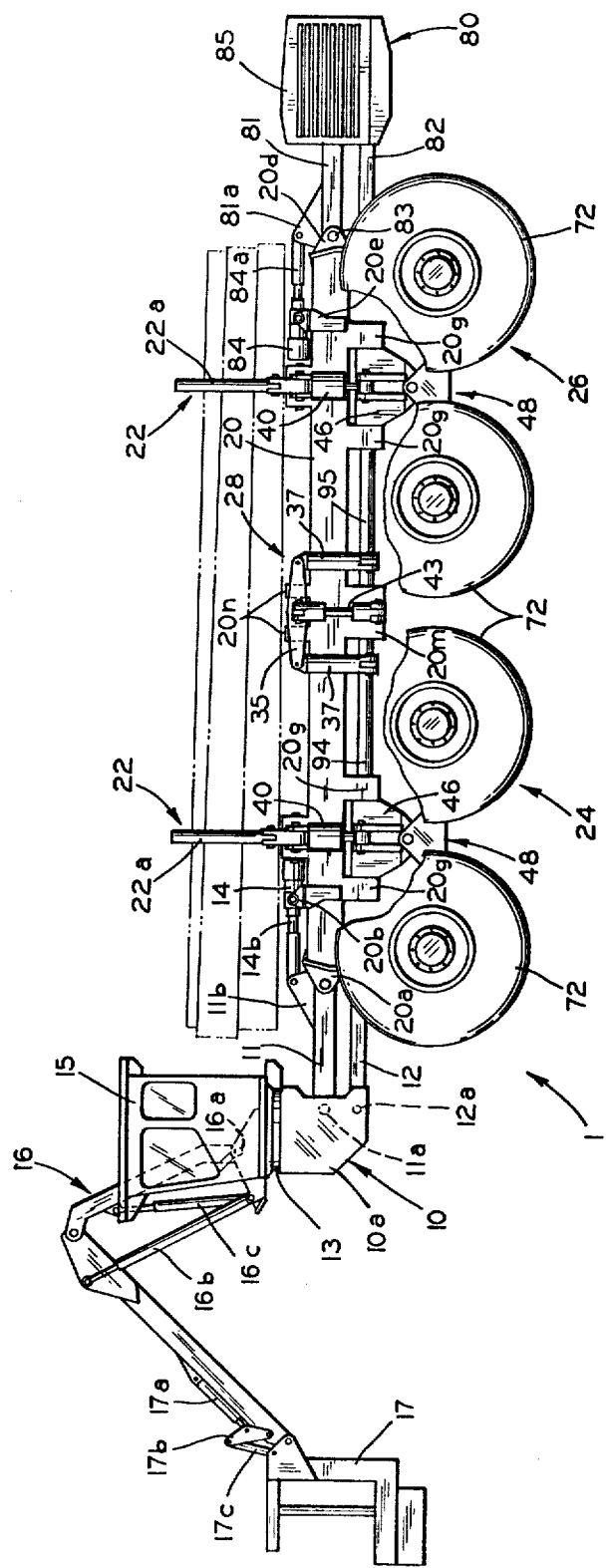
FIG. 1 is a side elevational schematic view of a tree harvesting and transport vehicle embodying this invention.
Figure 2:
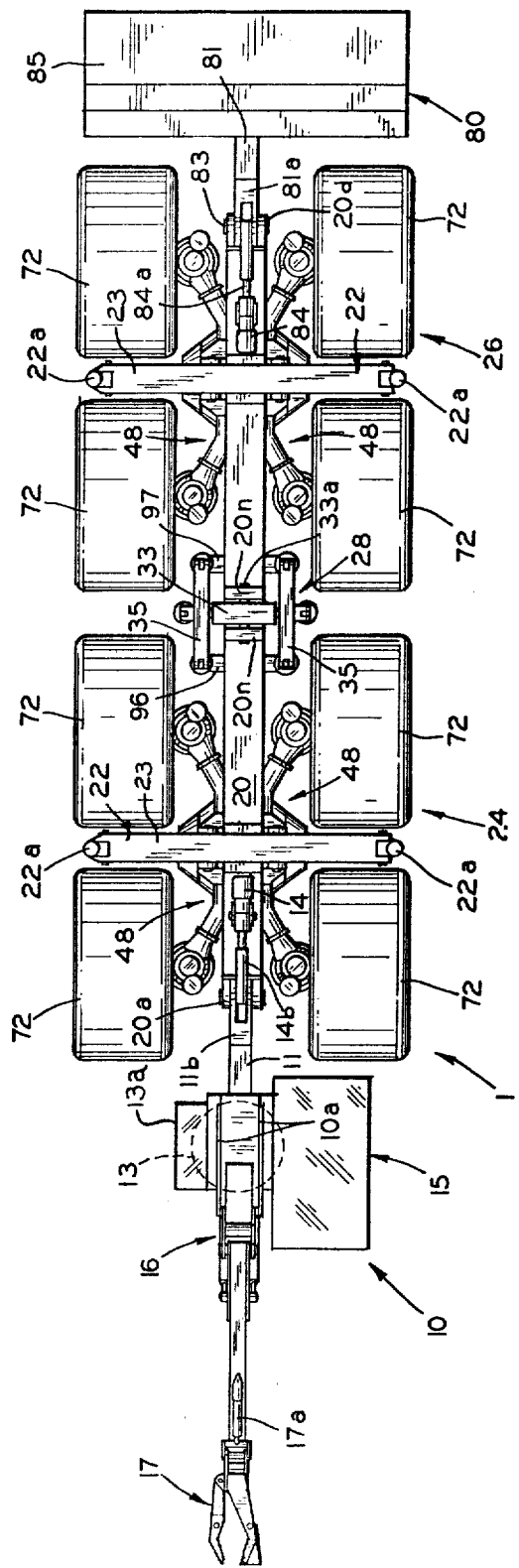
FIG. 2 is a plan view of FIG. 1.

The vehicle illustrated in FIGS. 1-4 of the drawings is a transportation vehicle for forwarding a group of whole trees from a harvesting area in a forest to a processing area adjacent to a road. Additionally, the illustrated vehicle is provided with a tree severing and loading boom so that the entire harvesting operation can be accomplished by the single vehicle.

Referring to the drawings, it will be seen that the vehicle 1 comprises an elongated, rigid, tubular main frame 20, including a plurality of load carrying cradle assemblies 22 spaced along its length and adapted to carry a plurality of whole trees or tree trunks. Each cradle 22 comprises a transverse beam 23 having uprights 22a pivotally secured to each end and latched in a vertical position by a conventional mechanism (not shown).

Front and rear quad wheel assemblies 24, 26 are respectively attached to the elongated bed frame 20 by journals so as to be pivotally movable about a longitudinal roll axis disposed parallel to and beneath the elongated bed frame. A roll control linkage means 28 interconnects the quad wheel assemblies with each other and with the elongated main frame 20 so as to control their relative positions about the roll axis during operation over rough terrain.

At the front end of the vehicle 1, an operator's platform 10 is provided and is secured to the front end of bed frame 20 by a pair of parallel links 11 and 12 which are pivoted on appropriate horizontal axis pivot pins 11a and 12a, which are in turn supported by spaced, depending flanges 10a on platform 10. The other ends of links 11 and 12 are pivotally secured to a U-shaped casting 20a secured to the front end of the elongated main frame 20. The vertical position of platform 10 is controlled by a hydraulic cylinder 14 which is mounted in a trunion bearing 20b secured to the elongated frame 20 and pivotally connected by piston rod 14b to an upstanding bracket 11b rigidly secured to the upper platform supporting link 11. In this manner, the vertical height of the platform 10 relative to the ground may be selectively adjusted by actuation of the cylinder 14.

On the top surface of platform 10 a conventional turntable 13 is journalled for rotation about a vertical axis, and an operator's cab 15, within which all of the controls for the vehicle 1 are provided, as well as a seat (not shown) for the operator, is mounted on top of turntable 13. A lateral projection 13a of the turntable 13 provides a horizontal axis pivotal mounting bracket 16a for a conventional articulated tree handling boom 16. A plurality of hydraulic cylinders 16b and 16c operate between the various articulated elements of boom 16 so as to permit the end of the boom to be moved by the operator from a position closely adjacent the ground to a loading position passing over the top of the cab 15 to deposit harvested trees in the load carrying cradles 22.

A conventional tree severing and engaging mechanism 17 is provided on the end of the articulated boom 16 and its position about a transverse horizontal axis is controlled by a cylinder 17a and links 17b and 17c. The tree severing and engaging mechanism 17 includes a pair of shears 17d which are actuated by suitable hydraulic means (not shown). The construction of the tree engaging and severing mechanism 17 forms no part of this invention and hence will not be described in further detail. Suffice it to say, such mechanism has the capability of engaging a tree to be harvested, severing the tree near the ground and then, while still engaged with the tree, the articulated boom 16 can be operated by the various cylinders 16a, 16b and 17a to lift the severed tree over the platform 10 and the operator's cab 15 and deposit the severed tree in the load carrying cradles 22 provided on the elongated frame 20, which has a total length exceeding that of the tree.

Suitable operator controlled motor means (not shown) are provided for turning turntable 13 about its vertical axis. Hence, the tree engaging mechanism 17 can be swung horizontally into engagement with a tree and the operator's cab is concurrently moved, so that the operator's view is always aligned with the tree to be harvested.

At the rear end of the elongated bed frame 20, a power unit platform 80 is adjustably mounted for movement in a vertical plane by a pair of parallel links 81 and 82, which are secured to appropriate pivots 83 provided in an end casting 20d secured to the end of the main frame 20. A hydraulic cylinder 84 suitably mounted in a trunion bearing 20e secured to the top of the rear end of the bed frame 20, controls the vertical position of the power unit platform 80 by having its piston rod 84a pivotally connected to an upstanding bracket 81a secured to one of the parallel links 81. In this manner, the vertical position of the power unit platform 80 may be selectively adjusted to an elevated position in order to clear obstacles on the terrain during either the forward or rearward movement of the vehicle, or to a lowered position adjacent the ground to permit convenient servicing of the power unit 85 mounted thereon.

All of the power required for the operation of the vehicle is provided by the power unit 85 mounted on platform 80 and such unit will normally comprise either a gasoline or diesel engine driving both a large hydraulic pump to provide pressured fluid for the operation of all hydraulic cylinders involved in the vehicle and an electrical generator for providing electrical power for the control curcits and for providing traction and steering power to the wheels, if electric motors are employed to operate same.

In the drawings, it will be noted that the front and rear quad wheel assemblies 24 and 26 are substantially identical to one another, so for the sake of brevity, the similar portions will be described with respect to one of them only. Accordingly, attention is directed to FIG. 3 of the drawings wherein details of the front quad wheel assembly 24 are illustrate. Such assembly is also described in my aforementioned copending application Ser. No. 934,459.

The suspension system for the front quad wheel assembly includes a main pivot block 46 which is pivotally suspended beneath the tubular main frame 20 between a pair of depending blocks 20g, thus providing pivotal movement about a longitudinal horizontal roll axis which is parallel to and slightly below the axis of the tubular main frame 20. Such pivotal mounting is not shown but is entirely conventional. A torque transmission tube 94 extends rearwardly from the main pivot block 46 and is co-movable therewith about the vehicle roll axis. A similar tube 95 extends forwardly from the rear quad wheel assembly and the adjacent ends of tubes 94 and 95 are respectively interconnected by a roll control linkage mechanism 28 to be hereinafter described.

The bottom portion of main pivot block 46 is provided with a pair of laterally projecting horizontal pivot pins 46a which respectively provide pivotal mounting for the medial portions of a pair of walking beams 48 which are identical configuration except that they are mounted in reversed positions on the pivot pins 46a. Each walking beam 48 is of a generally truncated W-shaped configuration in plan view including a central truncated inverted V-shaped portion 48a defining the bearing for the pivotal mounting on pin 46a, and identical angularly disposed tubular end elements 48b which provide mountings for steerable wheel units 60 of the quad wheel assemblies. The horizontal angle of elements 48b determines the maximum wheel turning angle.

A wheel mounting assembly 60 is secured to each free end of walking beam 48, and, as described in detail in my U.S. Pat. No. 4,205,730, each wheel mounting assembly 60 includes a main hollow housing 62 and a radially extending axle housing portion 64 connected to housing 62 by a conventional anti-friction swing bearing unit (not shown) to provide steering movements. On one side of housing 62, an integral collar 65 is formed to permit the convenient rigid mounting of the housing 62 to the respective tubular end 48b of the walking beam 48.

On the free end of axle housing portion 64 there is mounted a wheel hub member 70 and the hub member 70 not only provides for conventional mounting of a large, pneumatic rubber tired, ground engaging wheel 72 on its periphery, but also within such hub mounts a conventional planetary transmission for driving such wheel at reduced speed from a drive shaft which is axially disposed within the hub 70 and the axle housing 64 and driven by an electric or hydraulic motor 74 co-axially mounted on main housing 64. Tires 73 are massive and inflated by low pressure air to provide maximum traction and flotation.

A hydraulic or electric steering motor 80 is suitably mounted on the top of the main housing 62, and effects steering movements of axle housing 64 through a speed reduction mechanism (not shown).

The details of the controls for the rotation, braking and turning of each wheel 72 are described and claimed in my aforementioned co-pending application, Ser. No. 934,457.

From the description this far, it is also apparent that each quad wheel assembly 24, 26 is suspended relative to the main frame 20 in such fashion that the frame 20 may pivot relative to the quad wheel assemblies about a roll axis which is parallel to and slightly beneath the main frame 20. Concurrently, the wheels on each side of the quad wheel assembly may freely move in a vertical plane about a transverse horizontal pivot axis defined by the walking beam pivot pin 46a. Moreover, due to the "W" shape of each walking beam 48, steering movements of each of the wheels up to a thirty degree angle may be accomplished in either direction without interference with the suspension, the main frame or the load carrying cradles the vehicle.

The relative angular movement of the quad wheel assemblies 24, 26 with respect to each other and to the elongated bed frame assembly 21 is regulated by a roll control linkage 28, centrally located on the vehicle, that causes equal loading to be imposed on each quad wheel assembly, and also causes the bed frame assembly to be rotated proportionately, preferably one half the total angular displacement between the front and rear quad wheel assemblies, as exists at any one time. Angular displacement between the quad wheel assemblies relative to the roll axis obviously occurs during operation on uneven terrain or over boulders. The ground under the front quad wheel assembly may be laterally and possibly oppositely inclined to the ground under the rear quad wheel assembly, such as might occur while the vehicle is traversing a ditch at an angle.

Figure 4:
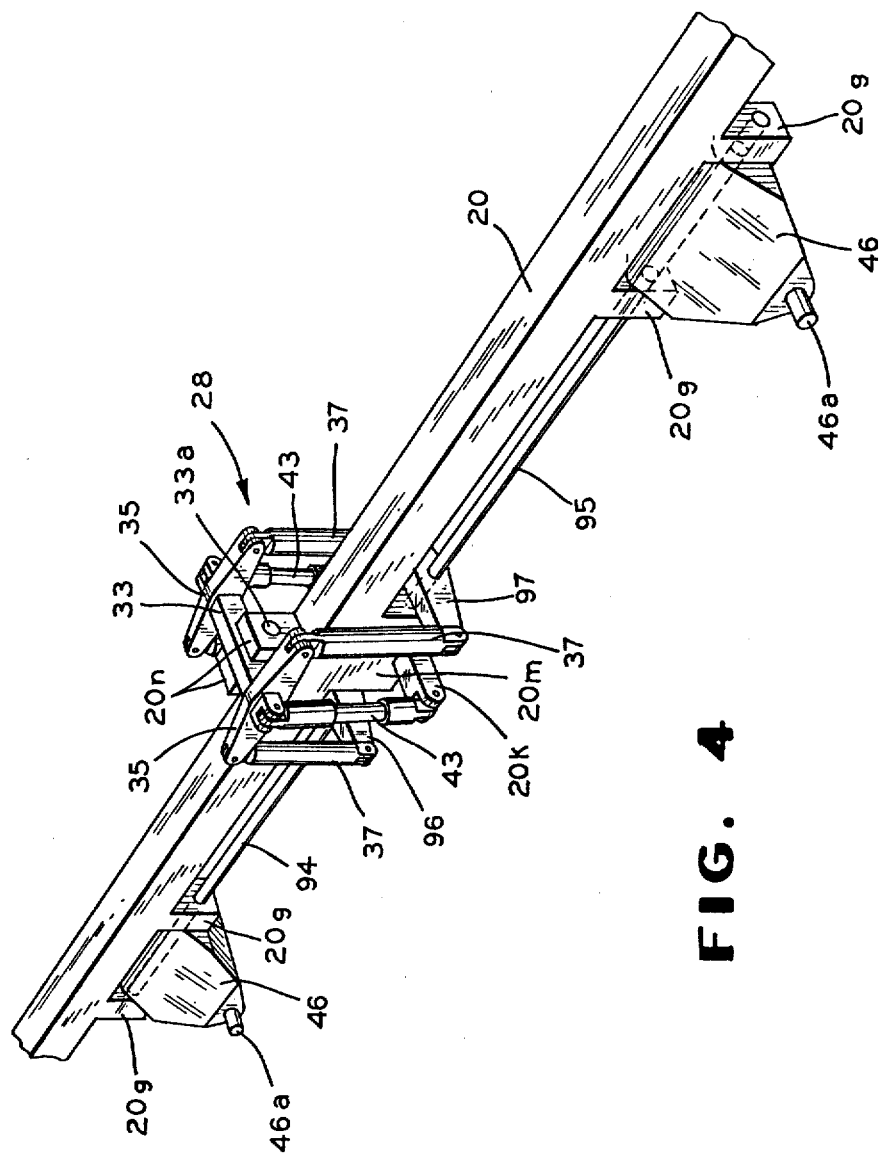
FIG. 4 is a perspective of the roll control mechanism the front and rear wheel assemblies.

Referring now to FIG. 4, the roll control linkage 28 will be described in greater detail. The rearward end of torque tube 94 and the forward end of torque tube 95 are suitably journalled in a depending frame block 20m and are disposed in coaxially aligned, juxtaposed relationship approximately in the center of the elongated main frame 20. Immediately above the ends of the torque tubes 94, 95, the frame 20 is provided with a pair of upstanding pivot ears 20n which support a pivot pin 33a which traverses the center portion of a transverse frame tilt lever 33. On each end of frame tilt lever 33 a longitudinal connecting lever 35 is centrally mounted for pivotal movement about a horizontal axis. Additionally, on each end portion of torque tubes 94 and 95, there are respectively rigidly secured primary transverse actuating levers 96 and 97 and the ends of these levers are in general vertical alignment respectively with the ends of the connecting levers 35. A plurality of links 37 are provided respectively having their ends connected by a universal joint connection to the aligned ends of primary levers 96 and 97 and the connecting levers 35. Thus, any pivotal movement of the quad wheel assemblies 24, 26 relative to the other will result in a pivoting movement of the associated primary levers 96, 97, which in turn effects a tilting movement of the main tilt control lever 33 to shift the position of the main frame 32 approximately one-half the amount of pivotal displacement of the quad wheel assembly relative to the roll axis. Thus, a very effective control of the movements of the main frame about the roll axis in response to much larger movements of the quad wheel assemblies is achieved, and, in effect, the roll control mechanism 28 provides for balancing the effects of terrain induced rotations of the two quad wheel assemblies in opposite directions about the roll axis.

Concurrently the roll control linkage effects a transfer of forces between the two quad wheel assemblies to equalize the loading thereon during movements about the roll axis. Such roll control linkage is described and claimed in my aforementioned copending application Ser. No. 934,459.

The modification of this invention heretofore described is particularly useful in the hauling of trimmed lengths of trees having a total length in excess of 60 feet. In some woodland operations, particularly as practiced in Canada, it is more desirable to employ an off-road vehicle for bringing out loads of fresh cut whole trees. A load of this type does permit some angular shifting of the load supporting cradles as the transporting vehicle navigates difficult terrain areas.

While the load supporting cradles 22 may be rigidly secured to main frame 20, I prefer to utilize the illustrated construction wherein the transverse beam 23 of the cradle is pivotally mounted to the top surface of the main frame 20. Such pivotal mounting is provided by a pair of upstanding ears 20h and a pivot pin 23a which traverses the cross-beam 23. Each cross-beam 23 is effectively secured for co-movement with the main pivot block 46 of the quad wheel assembly by a pair of parallel links 40, each of which has a bifurcated end 40a pivotally connected by a transverse pin 40b to the cross-beam 23, and the other end 40c pivotally connected between a pair of bifurcated ears 46b provided on the main pivot block 46 and traversed by a pivot pin 46c.

Figure 3:
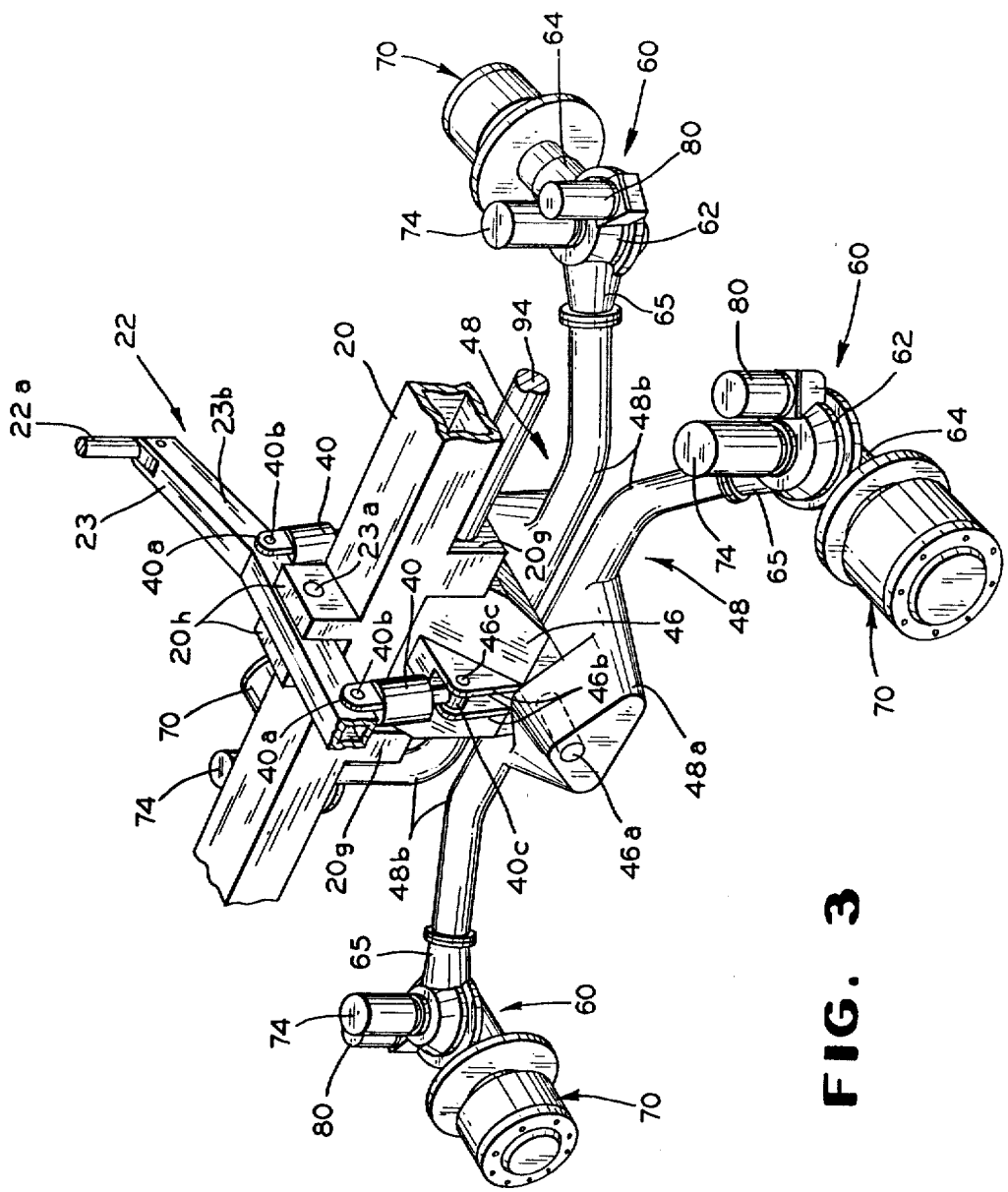
FIG. 3 is a perspective view of the major components of the wheel suspension, driving and steering mechanism for the vehicle of FIG. 1.

It may be desirable to form the load supporting beams 23 with the outer ends inclined upwardly as shown at 23b in FIG. 3, in order to provide additional clearance for the quad wheel assembly. The important thing is that as each quad wheel assembly moves about the roll axis to traverse the terrain, a corresponding pivotal movement of the load supporting cradles is imparted by virtue of the parallelogram linkage connection of the cross-beams 23 to the main pivot block 46. At the same time, the roll control linkage 28 is still operative to effectively balance out oppositely directed inclinations of the front and rear quad wheel assemblies and thus reduce to a minimum the pivotal movements of the tubular bed frame 20 about the vehicle roll axis.

The advantage of this construction is a significant reduction in the height of the load carrying cradles relative to the main frame, hence lowering the center of gravity of the load.

A further feature of this invention is the addition to the roll control lever assemblage 28 of a pair of power actuated stabilizing links which permit the operator to adjust the static position of the tubular main frame 20, hence the operator's platform 10, relative to the roll axis. Referring to FIG. 4, such links may comprise power actuated extensible elements 43 which are respectively connected between the extreme ends of the tilt control lever 33 and the bifurcated ends of lateral projections 20k formed on a depending block 20j provided on the underside of the tubular bed frame 20. As the one stabilizing link 43 is extended by the application of either hydraulic or electric power thereto, the other link 43 is retracted so that the net effect is that the frame 20 is rotated and the load supporting cradles or cross-beams 23 are shifted laterally and angularly with respect to the roll axis. Thus, the load may be maintained in a substantially horizontal position, even though the vehicle is being operated continuously on a hillside. This capability for adjusting the static angular position of the load carrying cradles relative to the roll axis provides additional stability to the vehicle and hence permits larger loads to be safely carried along a relatively steep hillside.

Of equal importance is the fact that the adjustment of the position of the main frame 20 with respect to the roll axis by the selective actuation of the extensible links 43 is of great value in permitting the operator's platform to be maintained in a substantially horizontal position irrespective of the slope of the terrain on which the vehicle may be located. Thus, even though the vehicle is operating along the side of a relatively steep slope, the operator's platform 10 may be maintained in a substantially horizontal position, resulting in the tree-engaging element 17 on the end of boom 16 being generally vertically disposed, hence, more readily engagable with trees growing on the slope which normally grow vertically, irrespective of the slope. On the other hand, if the harvesting vehicle approaches a tree which is growing at an angle, the selective adjustment of the stabilizing links 43 by the operator will permit the main frame 20 and the platform 10 to be tilted relative to the supporting wheels so that the tree engaging mechanism 17 is more accurately aligned with the slope of the tree to be harvested.

It will also be apparent that an extreme extension of either of the stabilizing links 43 can effect the dumping of the load on a selected side of the vehicle by shifting the center of gravity of the load. The vertical rails 22a of each cradle are pivotally mounted on the ends of the transverse beam and latched in the upright position so that they may be readily dropped for unloading. Dumping of the load may be accomplished by tilting of the load carrying cradles 22 with respect to the main frame 20 by utilizing power actuated extensible elements as the links 40 which interconnect the transverse beams 23 of the load carrying cradles 22 with the vehicle suspension. The extension of one link 40 while the other link is retracted will permit the selective dumping of the load on either side of the vehicle. During all other operations, the extensible elements are maintained in a fixed length position.

It will be very apparent to those skilled in the art that the flexibility, hence efficiency, of the described tree harvesting vehicle is outstanding. Not only will the vehicle traverse rough roadless terrain, but major components of the vehicle, namely the operator's platform, the tree engaging mechanism and the power supply can all be vertically raised to clear upstanding obstructions or lowered to clear overhanging obstructions. Under all operating conditions, the operator's cab may be maintained by the operator in a substantially vertical normal position, regardless of the contour of the terrain over which the vehicle is traversing or on which it is stationary, thus insuring not only maximum comfort to the operator, but minimum interference with his operation of the vehicle. At any time that a particular tree is to be harvested, the tree engaging mechanism 17 can be swung horizontally be virtue of the turntable 13 to engage a tree without requiring the movement of the entire vehicle, and the operator's cab moves concurrently with the tree engaging elements of the machine, thus affording the operator unimpeded vision of the harvesting operation.

Figure 5:
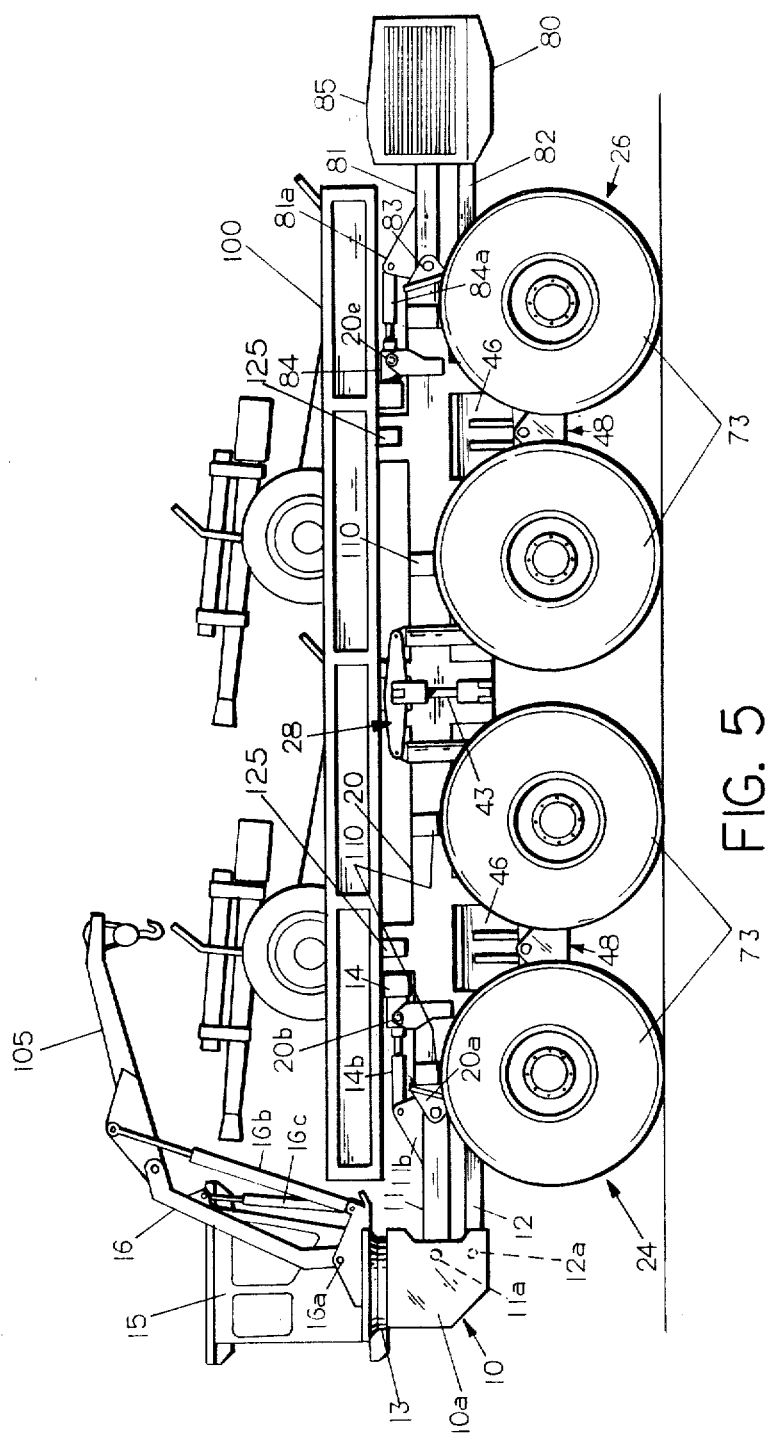

Referring now to FIG. 5, there is illustrated a modification of this invention wherein the off-road vehicle of this invention is adapted for the loading and hauling of massive articles such as disabled vehicles, pieces of military equipment, bulk supplies ect. Similar numbers in FIG. 5 illustrate similar components of the vehicle illustrated in FIGS. 1 through 4; the changed components are indicated by a 100 series of numbers.

Thus, an elongated rigid main frame 20 is again provided and is supported by a pair of quad wheel assemblies 24, 26 which are suspended relative to the main frame 20 in the same manner as heretofore described. Each quad wheel assembly mounts four ground engaging wheels 72, which in turn are supported by massive pneumatic tires 73.

To provide an appropriate carrying platform for the massive articles to be transported, a rigid platform 100 is provided which is mounted on the main frame element 20 in any conventional fashion. For example, transverse depending ribs 125 may be secured to the underside of platform 100 by welding and then welded to the upstanding ears 20h secured to main frame 20. Additionally, instead of mounting a tree severing and engaging mechanism on the end of a boom which is mounted on the turn table 13, a boom 105 is provided which is designed to effect the lifting of massive objects to be placed on the vehicle platform 100. Such boom mechanism is entirely conventional and forms no part of this invention. The rotational movement of the turn table 13 about its vertical axis permits the boom 105 to be rotated so as align with a massive object, located at any angular relationship relative to the off-road vehicle, pick it up, and then rotate to deposit it on the platform 100.

Referring now particularly to FIGS. 6 thru 9, there is shown an unique wheel elevating mechanism which may be employed in the event that one of the wheel elements, for example, tire 73, becomes inoperative, to elevate the wheel and permit the vehicle to be moved to a repair site on the remaining wheels.

Figure 6:
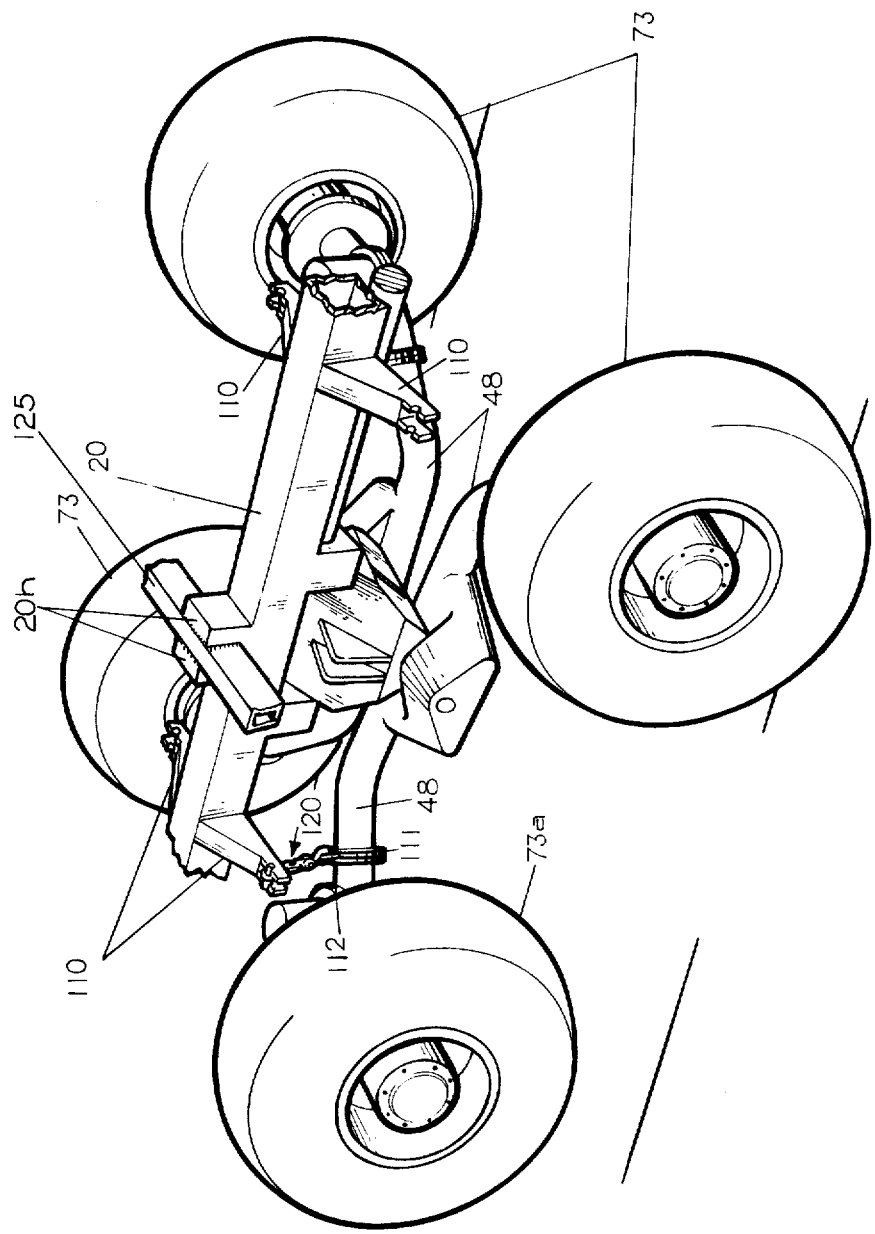
FIG. 6 is a perspective view of one of the quad wheel assemblies employed in FIG. 5 illustrating the mechanism provided for effecting the elevation of a particular wheel in the event that the pneumatic tire is deflated.
Figure 7:
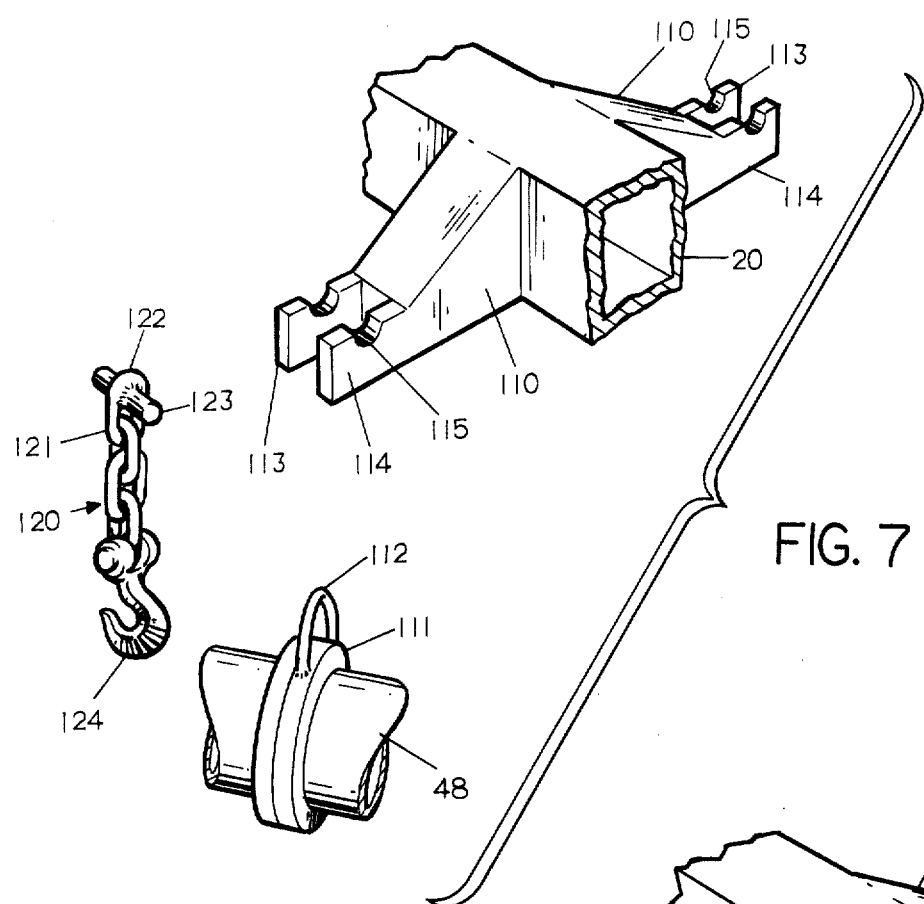
FIG. 7 is an enlarged scale exploded perspective view of the wheel elevating and carrying elements that are provided in FIG. 6.
Figure 8:
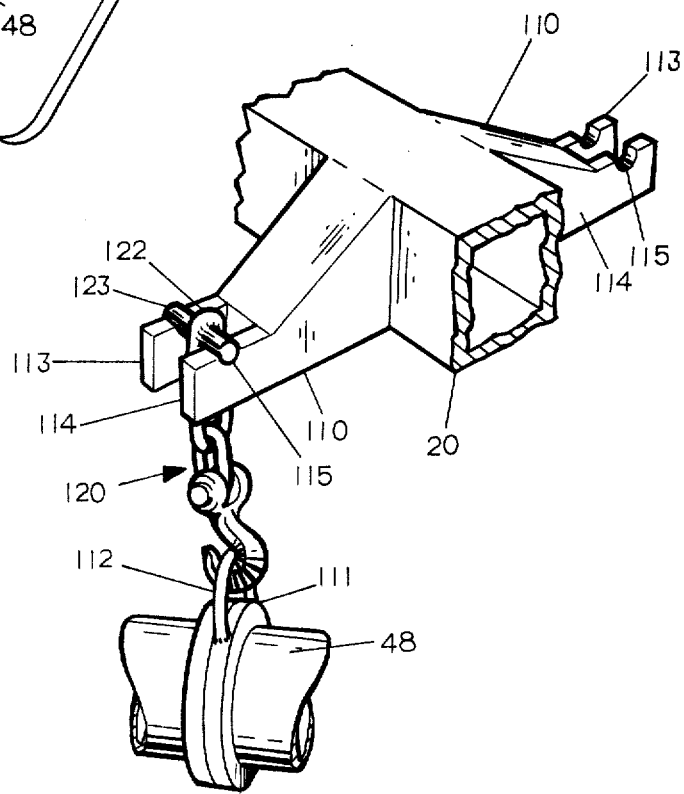
FIG. 8 is a perspective view of the carrying elements of FIG. 7 in operational positions.

As best shown in FIGS. 6, 7 and 8 a plurality of laterally projecting brackets 110 are respectively rigidly secured, as by welding, to the sides of the main frame element 20 in positions respectively overlying the extremities of the W-shaped walking beams 48. On each walking beam 48, a collar 111 is suitably rigidly secured and the collar 111 is provided with an integral ring 112 on its upper portion. The outer extremities of each bracket 110 is bifurcated as indicated at 113 and 114 and these bifurcated ends are provided with vertically extending notches 115.

In the event that one of the wheel elements becomes inoperable, the main frame 20 is pivoted about its roll axis by operation of the power actuated extensible links 43, which were heretofore described. The bifurcated ends 113 and 114 of bracket 110 are thus brought into closely spaced, overlying relationship with the ring 112 provided on the end of the W-shaped walking beam 48 adjacent to the wheel having the flat tire. A connecting link 120 may then be manually connected between the bifurcated outer ends of the particular bracket 110 and the particular ring 112.

The link 120 may conveniently comprise a length of chain 121 having a plate 122 secured to one end, which plate is readily insertable between the bifurcations 113 and 114 and secured thereto by a transverse pin 123 which engages the notches 115. The other end of chain 121 is provided with a hook 124 which may be slipped through the ring 112. Then, when the main frame element 20 is restored to its normal position by reverse pivotal movement about its roll axis through energization of the power actuated links 43, the connecting link 120 effects the lifting of the inoperable to achieve wheel station redundancy.

Figure 9:
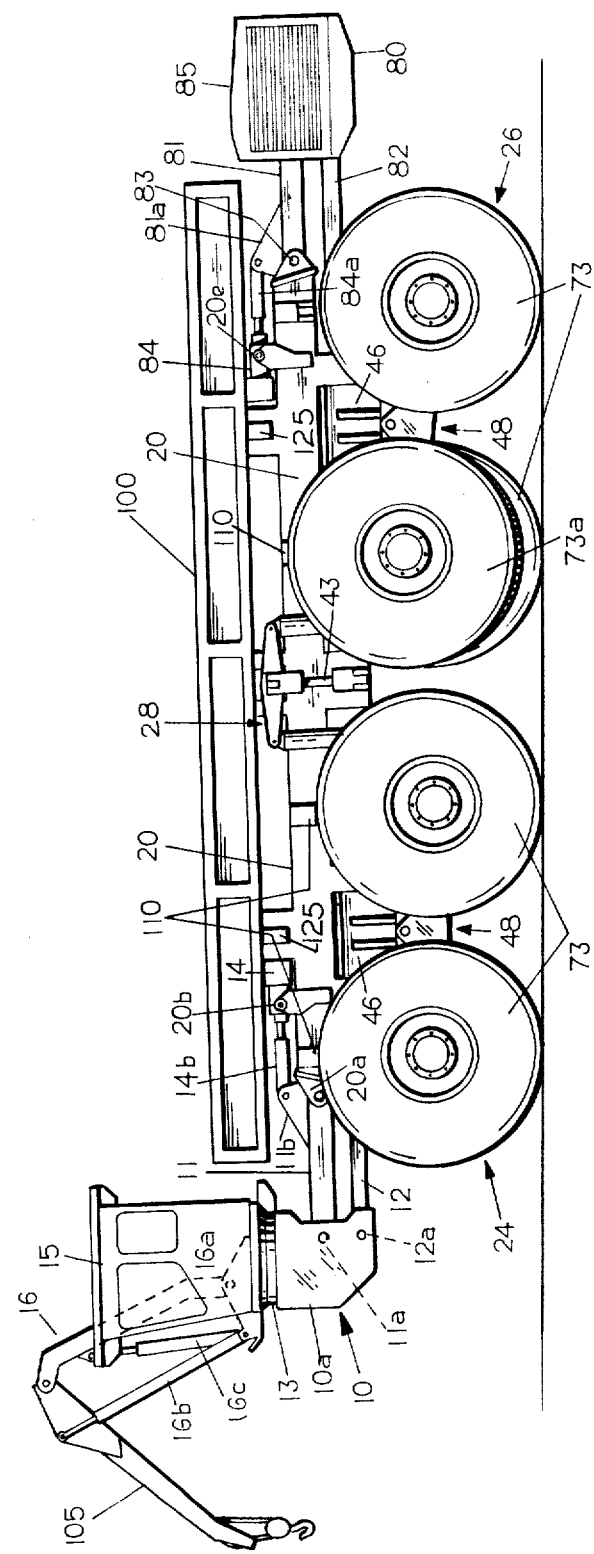
FIG. 9 is a view similar to FIG. 5 illustrating one wheel in its elevated position.

Referring now to FIG. 9, it will be seen that the vehicle is then supported by the remaining wheels, but with the inoperable wheel in an slightly elevated position relative to the ground so that the vehicle may be driven to a repair site. Thus, the necessity for removing or repairing wheel elements in the field is substantially eliminated.

Modifications of the invention herein described and illustrated will be readily apparent to those skilled in the art, and it is intended that the scope of the invention be determined solely by the appended claims.

I claim:

1. Vehicle for transporting massive objects over natural terrain, comprising, in combination:
   (1) an elongated rigid frame element;
   (2) means on said frame element for supporting massive objects;
   (3) a pair of quad wheel assemblies, each assembly including a primary mounting member pivotally attached to said frame element for movement about a roll axis parallel to the longitudinal axis of the elongated frame element, a pair of walking beams medially pivotally attached to opposite transverse sides of said primary mounting member for movements about a transverse pitch axis and a wheel steerably mounted on free ends of each walking beam, whereby said wheels may conform to irregularities in the terrain traversed;
   (4) an operator's platform having linkage means pivotally connecting same to one end of said elongated frame element for vertical movements relative thereto, including power means for selectively adjusting the vertical position of said platform relative to said elongated frame element; and
   (5) power operated linkage means for adjusting the position of said elongated rigid frame element about said roll axis, thereby adjusting the position of the operator's platform, permitting same to be substantially horizontal when the vehicle wheels are positioned on the side of a slope.

2. The combination defined in claim 1 plus power means for applying traction power individually to each said wheel, power means for supplying steering torque individually to each said wheel, and a power generating unit mounted on the other end of said elongated frame element to supply power to all power means mounted on the apparatus.

3. The combination defined in claim 1 plus means mounted on said operator's platform for loading massive objects on the vehicle.

4. The vehicle defined in claim 2 plus power actuated means for selectively positioning said power generating unit in any one of a plurality of vertical positions relative to said elongated frame element.

5. A vehicle for loading and transporting massive objects over natural terrain, comprising, in combination:
   (1) an elongated rigid frame element of a length at least equal to that of the objects to be transported;
   (2) a platform on said rigid frame element for supporting the massive objects;
   (3) an operators platform having linkage means pivotally connecting same to one end of said frame element for vertical movement relative thereto, including power means for selectively adjusting the vertical position of said platform relative to said frame element;
   (4) crane means on said platform for loading massive objects on said platform;
   (5) a pair of quad wheel assemblies, each assembly pivotally attached to said elongated rigid frame element for movement about a roll axis parallel to the longitudinal axis of said elongated rigid frame element, a pair of walking beams medially pivotally attached to opposite transverse sides of said primary mounting member for movements about a transverse pitch axis, and a wheel steerably mounted on the free ends of each walking beam;
   (6) power means for applying traction power to each wheel;
   (7) power means for controlling the steering position of each wheel;
   (8) a power source for supplying power to all power consuming means on the apparatus mounted on the other end of said elongated frame element, whereby said apparatus may freely traverse rough roadless terrain to transport massive objects to a desired location.

6. The vehicle defined in claim 5 wherein the mounting for said power source at the other end of said rigid frame element includes power actuated linkage means for selectively positioning said power source in any one of plurality of vertical positions relative to said elongated rigid frame element.

7. The vehicle defined in claims 1 or 5 wherein each of said quad wheel assemblies have a longitudinally extending torque tube coincident with the said roll axis, and having one end secured to a primary mounting member and their other ends disposed in juxtaposition near the center of the elongated frame element, and linkage means interconnecting the juxtaposed ends of said torque tubes to effectively transfer forces from one quad wheel assembly to the other in response to the variations in terrain traversed by respective quad wheel assemblies.

8. A vehicle for loading and transporting massive objects over natural terrain, comprising, in combination:
(1) an elongated rigid frame element of a length at least equal to that of the massive objects to be transported;
(2) a load carrying platform mounted on said rigid frame element;
(3) a second platform having linkage means pivotally connecting same to one end of said elongated frame element for vertical movements relative thereto, including power means for selectively adjusting the vertical position of said platform relative to said elongated frame element;
(4) a turn table mounted on said second platform for rotation about a vertical axis, including power means for selectively adjusting the angular position of said turn table relative to said platform;
(5) an operator's cab on said second platform, including all control means for said vehicle;
(6) means on said platform for loading objects onto said load carrying platform;
(7) a pair of quad wheel assemblies respectively connected to longitudinally spaced portions of said elongated rigid frame element, each said assembly including mounting means for said wheels permitting movements of the wheels relative to said elongated main frame element about a roll axis parallel to the longitudinal axis of said elongated rigid frame element, and
(8) power operated means for adjusting the angular position of said elongated rigid frame element about said roll axis, thereby adjusting the position of said second platform to permit same to be substantially horizontal when the vehicle wheels are positioned on the side of a slope.

9. The vehicle defined in claim 8 wherein each of said quad wheel assemblies include a primary mounting member pivotally attached to elongated frame element for movement about said roll axis, and a pair of walking beams medially pivotally attached to opposite transverse pitch axis, and a wheel steerably mounted on each end of each walking beam.

10. The vehicle defined in claim 8 and 9 additionally including power means for applying traction power to each wheel, power means for controlling the steering position of each wheel, a power source for supplying power to all power consuming means on the apparatus mounted on the other end of said elongated rigid frame element, and power actuated linkage means for selectively positioning said power source in any one of a plurality of vertical positions relative to said elongated frame element.

11. The vehicle defined in claims 1, 2, 3, 4, 8, 9, or 10 plus a plurality of brackets secured to said elongated rigid frame element respectively in overlying relation to the end portions of said walking beams, and linkage means for selectively connecting the one end of a walking beam to said respective bracket when said elongated rigid frame element is tilted by said power operated means about said roll axis toward said one end, whereby return movement of said elongated rigid frame element about said roll axis effects the elevation of said one end of the walking beam and the wheel carried thereon to render such wheel redundant.

12. In an off-road vehicle comprising, in combination:
(1) an elongated rigid frame element having means thereon for supporting a load;
(2) a pair of quad wheel assemblies, each assembly being pivotally attached to said elongated rigid frame element for movement about a roll axis parallel to the longitudinal axis of said elongated rigid frame element;
(3) a pair of walking beams medially pivotally attached to opposite transverse sides of each said primary mounting member for movements about a transverse pitch axis, and a wheel mounted on the free ends of each walking beam;
(4) power operated means for adjusting the angular position of said elongated rigid frame element about said roll axis;
(5) a plurality of laterally projecting brackets secured to said elongated rigid frame element respectively in overlying relation to the end portions of said walking beams, and
(6) linkage means for selectively connecting one end of a walking beam to said respective overlying bracket when said elongated rigid frame element is tilted by said power operated means about said roll axis toward said one end of the walking beam, whereby return movement of said elongated rigid frame element about said roll axis effects the elevation of said one end of the walking beam and the wheel carried thereon to thereby render such wheel redundant.

13. The vehicle defined in claim 12 wherein said linkage means comprises a length of chain having manually operable attachment means at its opposite ends for respective attachment to said one end of the walking beam and to the respective overlying bracket.

14. Apparatus for transporting whole trees over natural terrain, comprising, in combination:
(1) an elongated frame element of a length at least equal to that of the trees to be transported;
(2) a plurality of tree retaining cradles transversely mounted on said frame element;
(3) a pair of quad wheel assemblies, each assembly including a primary mounting member pivotally attached to said frame element for movement about a roll axis parallel to the longitudinal axis of the elongated frame element, a pair of walking beams having their medial portions respectively pivotally attached to opposite transverse sides of said primary mounting member for movements about a transverse pitch axis and a wheel steerably mounted on the free end of each walking beam, whereby said wheels may conform to irregularities in the terrain traversed;
(4) an operator's platform having linkage means pivotally connecting same to one end of said elongated frame element for vertical movements relative thereto, including power means for selectively adjusting the vertical position of said platform relative to said elongated frame element; and (5) power operated linkage means for adjusting the position of said elongated frame element about said roll axis, the  by adjusting the position of the operator's platform, permitting same to be substantially horizontal when the vehicle wheels are positioned on the side of a slope.

15. The combination defined in claim 14 plus power means for applying traction power individually to each said wheel, power means for supplying steering torque individually to each said wheel, and a power generating unit mounted on the other end of said elongated frame element to supply power to all power means mounted on the apparatus.

16. The combination defined in claim 14 plus means mounted on said operator's platform for engaging and loading trees in said cradles.

17. The apparatus defined in claim 15 plus power actuated means for selectively positioning said power generating unit in any one of a plurality of vertical positions relative to said elongated frame element.

18. Apparatus for loading and transporting whole trees over natural terrain, comprising, in combination:
 (1) an elongated rigid frame element of a length at least equal to that of the trees to be transported;
 (2) a plurality of tree retaining cradles mounted on said frame element;
 (3) an operator's platform having linkage means pivotally connecting same to one end of said frame element for vertical movement relative thereto, including power means for selectively adjusting the vertical position of said platform relative to said frame element;
 (4) means on said platform for engaging and loading trees in said cradles;
 (5) a pair of quad wheel assemblies, each assembly including a primary mounting member pivotally attached to said elongated frame element for movement about a roll axis parallel to the longitudinal axis of said elongated frame element, a pair of walking beams having their medial portions respectively pivotally attached to opposite transverse sides of said primary mounting member for movements about a transverse pitch axis, and a wheel steerably mounted on each free end of each walking beam;
 (6) power means for applying traction power to each wheel;
 (7) power means for controlling the steering position of each wheel;
 (8) a power source for supplying power to all power consuming means on the apparatus mounted on the other end of said elongated frame element, whereby said apparatus may freely traverse rough roadless terrain to transport a plurality of whole trees to a desired location.

19. The apparatus defined in claim 18 wherein the mounting for said power source at the other end of said frame element includes power actuated linkage means for selectively positioning said power source in any one of a plurality of vertical positions relative to said elongated frame element.

20. Apparatus defined in claims 18 or 19 wherein said tree engaging and loading means comprises an articulated boom mounted on said platform, including power means for shifting said boom, and tree engaging means on the free end of said boom.

21. The apparatus defined in claim 20 wherein said tree engaging means includes power actuated tree severing means.

22. The apparatus defined in claim 14 or 18 wherein said cradles comprise U-shaped elements having the medial portion of their base pivotally secured to said elongated frame member for movement about an axis parallel to the length axis of the longitudinal frame element, and a pair of linkage means respectively connecting outer portions of said cradle base member to the outer portions of said primary mounting member, whereby said cradles are tilted in response to tilting motion of said primary mounting members about the roll axis of the apparatus.

23. The apparatus defined in claims 14 or 18 wherein each of said quad wheel assemblies has a longitudinally extending torque tube coincident with the said roll axis, and having one end secured to a primary mounting member and their other ends disposed in juxtaposition near the center of the elongated frame element, and linkage means interconnecting the juxtaposed ends of said torque tubes to effectively transfer forces from one quad wheel assembly to the other to equalize loading thereon produced by variations in terrain traversed by the respective quad wheel assemblies.

24. Apparatus for loading and transporting whole trees over natural terrain, comprising, in combination,
 (1) an elongated rigid frame element of a length sufficient to support the trees to be transported;
 (2) a plurality of tree retaining cradles mounted on said frame element;
 (3) a platform having linkage means pivotally connecting same to one end of said elongated frame element for vertical movements relative thereto, including power means for selectively adjusting the vertical position of said platform relative to said elongated frame element;
 (4) a turn table mounted on said platform for rotation about a vertical axis, including power means for selectively adjusting the angular position of said turn table relative to said platform;
 (5) an operator's cab on said platform, including all control means for said vehicle;
 (6) means on said platform for engaging and loading trees in said cradles;
 (7) a pair of quad wheel assemblies respectively connected to longitudinally spaced portions of said elongated frame element, each said assembly including mounting means for said wheels permitting movements of the wheels relative to said elongated main frame element about a roll axis parallel to the longitudinal axis of said elongated main frame element, and
 (8) power operated means for adjusting the angular position of said elongated frame element about said roll axis, thereby adjusting the position of said platform to permit same to be substantially horizontal when the vehicle wheels are positioned on the side of a slope.

25. The apparatus defined in claim 24 wherein each of said quad wheel assemblies include a primary mounting member pivotally attached to elongated frame element for movement about said roll axis, and a pair of walking beams pivotally attached to opposite transfer sides of said primary mounting member for movement about a transverse pitch axis, and a wheel steerably mounted on each end of each walking beam.

26. The apparatus defined in claim 24 or 25 additionally including power means for applying traction power to each wheel, power means for controlling the steering position of each wheel, a power source for supplying power to all power consuming means on the apparatus mounted on the other end of said elongated frame element, and power actuated linkage means for selectively positioning said power source in any one of a plurality of vertical positions relative to said elongated frame element.

* * * * *